(12) United States Patent
Miki

(10) Patent No.: US 7,285,232 B2
(45) Date of Patent: Oct. 23, 2007

(54) CONDUCTIVE PASTE AND CERAMIC ELECTRONIC COMPONENT

(75) Inventor: Takeshi Miki, Omihachima (JP)

(73) Assignee: Murata Manufacturing Co., Ltd (JP)

( * ) Notice: Subject to any disclaimer, the term of this patent is extended or adjusted under 35 U.S.C. 154(b) by 376 days.

(21) Appl. No.: 11/041,416

(22) Filed: Jan. 25, 2005

(65) Prior Publication Data
US 2005/0184278 A1 Aug. 25, 2005

(30) Foreign Application Priority Data
Feb. 19, 2004 (JP) .............................. 2004-042274

(51) Int. Cl.
H01B 1/22 (2006.01)
H01C 7/00 (2006.01)
(52) U.S. Cl. ..................... 252/514; 338/22 R; 428/434
(58) Field of Classification Search ................ 252/514; 338/22 R; 428/434
See application file for complete search history.

(56) References Cited

U.S. PATENT DOCUMENTS

| | | | |
|---|---|---|---|
| 4,029,605 A * | 6/1977 | Kosiorek | ..................... 252/514 |
| 4,400,214 A | 8/1983 | Ogawa et al. | |
| 4,451,869 A | 5/1984 | Sakabe et al. | |
| 5,206,620 A * | 4/1993 | Watanabe et al. | ......... 336/84 M |
| 5,714,246 A * | 2/1998 | Shaikh et al. | ................ 428/323 |
| 6,663,798 B2 * | 12/2003 | Sato et al. | ................... 252/512 |

FOREIGN PATENT DOCUMENTS

| | | |
|---|---|---|
| JP | 01-315903 | 12/1989 |
| JP | 06-349313 | 12/1994 |

* cited by examiner

*Primary Examiner*—Mark Kopec
(74) *Attorney, Agent, or Firm*—Dickstein, Shapiro, LLP.

(57) ABSTRACT

A conductive paste contains conductive powder, glass powder and an organic vehicle. The glass powder contains about 10% to 31% of $B_2O_3$, about 65% to 86% of $SiO_2$, and more than about 0.5% to less than about 5% of $M_2O$ on a weight basis, wherein M represents an alkali metal element. A ceramic electronic component includes a ceramic element and an external conductor placed on the component element. The external conductor contains a glass component containing about 10% to 31% of $B_2O_3$, about 65% to 86% of $SiO_2$, and more than about 0.5% to less than about 5% of $M_2O$ on a weight basis, wherein M represents an alkali metal element.

16 Claims, 1 Drawing Sheet

CONDUCTIVE PASTE AND CERAMIC ELECTRONIC COMPONENT

BACKGROUND OF THE INVENTION

1. Field of the Invention

The present invention relates to conductive pastes and ceramic electronic components. The present invention particularly relates to a conductive paste used to manufacture external conductors of ceramic electronic components and also relates to a ceramic electronic component such as a monolithic ceramic capacitor.

2. Description of the Related Art

In general, ceramic electronic components such as monolithic ceramic capacitors are prepared by a procedure in which a conductive paste for forming external conductors is applied onto both ends of ceramic elements and the resulting ceramic elements are dried and then fired. In order to enhance the solder wettability and the soldering heat resistance, the external conductors are coated with metal coatings such as Ni coatings, Sn coatings or solder coatings.

Examples of the conductive paste include a dispersion containing an organic vehicle; conductive powder, such as Ag powder, Ag—Pd powder or Cu powder dispersed therein; and glass powder (glass frit) dispersed therein. A known glass powder containing zinc borosilicate is disclosed in, for example, Japanese Unexamined Patent Application Publication Nos. 59-184511 and 6-349313.

Since zinc borosilicate glass has a low softening point in general, the glass melts and flows during firing. Therefore, there is a problem in that the molten glass extends to the surfaces of the external conductors to cover the electrode surfaces and this causes a deterioration in the platability of the external conductors. A deterioration in platability leads to inferior solder wettability and soldering heat resistance.

Since the molten glass leaks out of the external conductors to flow into the interfaces between the ceramic element and the external conductors, the external conductors become porous. Therefore, there is also a problem in that a plating solution penetrates the external conductors during plating and this causes a decrease in the adhesion between the ceramic element and the external conductors. Furthermore, there is a problem in that when the plating solution is present in the external conductors, water contained in the plating solution is vaporized and expanded by heat applied thereto during component-mounting so rapidly as to appear to cause an "explosion" in the external conductors, disturbing their integrity. The zinc borosilicate glass with a low softening point is soluble in the plating solution and this promotes the penetration of the plating solution.

SUMMARY OF THE INVENTION

The present invention has been made to solve the above problems. It is an object of the present invention to provide a conductive paste for forming a conductor having superior platability and a high density and a ceramic electronic component including such a conductor.

The inventors have performed intensive research in order to achieve the above object and then found that an external conductor made of a conductive paste containing zinc borosilicate glass powder with a specific composition, provides the ceramic electronic component conductors with superior platability and high density.

The present invention has been made based on the above findings. A conductive paste of the present invention contains conductive powder, glass powder, and an organic vehicle. The glass powder contains about 10% to 31% of $B_2O_3$, about 65% to 86% of $SiO_2$, and more than about 0.5% to less than about 5% of $M_2O$ on a weight basis, wherein M represents an alkali metal element.

In the conductive paste, the conductive powder preferably contains spherical particles with an average particle size of about 0.5 to 1.0 μm and flat particles having an average particle size of about 1.5 to 5.0 μm and an aspect ratio of about 5:1 to 70:1, the aspect ratio being defined as the ratio of the maximum diameter to the average thickness, and the ratio of the amount of the spherical particles to that of the flat particles preferably ranges from about 1:4 to 4:1 on a weight basis.

In the conductive paste, conductive powder preferably contains at least one selected from the group consisting of Ag, Pd, Ag—Pd alloy and Au.

A ceramic electronic component of the present invention includes a ceramic element and an external conductor placed on the component element. The external conductor contains a glass component containing about 10% to 31% of $B_2O_3$, about 65% to 86% of $SiO_2$, and more than about 0.5% to less than about 5% of $M_2O$ on a weight basis, wherein M represents an alkali metal element.

In the ceramic element, the external conductor preferably contains at least one selected from the group consisting of Ag, Pd, Ag—Pd alloy and Au.

The ceramic element preferably further includes an internal conductor, placed in the ceramic element, electrically connected to the external conductor.

The internal conductor preferably contains at least one of Ag and Pd.

The ceramic element preferably further includes a metal coating placed on the external conductor.

The metal coating preferably includes a Ni sub-coating placed on the external conductor and a Sn sub-coating placed on the Ni sub-coating.

The conductive paste of the present invention contains alkali borosilicate glass having a characteristic composition and a moderately high softening point. Therefore, the glass hardly melts to extend to surfaces of conductors during firing; hence, a conductor having superior platability, high solder wettability, and high heat resistance can be formed using the conductive paste.

The conductor hardly has pores therein and is therefore dense. Therefore, the following problems can be prevented: plating solution penetration of the conductor; adhesion reduction of the conductor to a coated member such as a ceramic element; and a "explosion" in the conductor during component-mounting.

Since the conductive powder contains the spherical particles and flat particles mixed at a predetermined ratio, the adhesion of the conductor to the coated member is high; hence, the effect of any "explosion" occurring in the conductor is minimized.

The ceramic electronic component of the present invention includes the external conductor containing the alkali borosilicate glass having a characteristic composition and is therefore superior in platability, solder wettability, and heat resistance. Since the external conductor is dense, the external conductor is securely joined to the ceramic element and an "explosion" is prevented from occurring in the conductor during component-mounting.

Although the internal conductor is placed in the ceramic element, a plating solution can be prevented from entering the interface between the ceramic element and the internal conductor because the plating solution cannot pass through the external conductor, whereby the internal conductor can be prevented from being separated from the ceramic element, that is, the delamination therebetween can be prevented.

DESCRIPTION OF THE PREFERRED EMBODIMENTS

Figure 1:
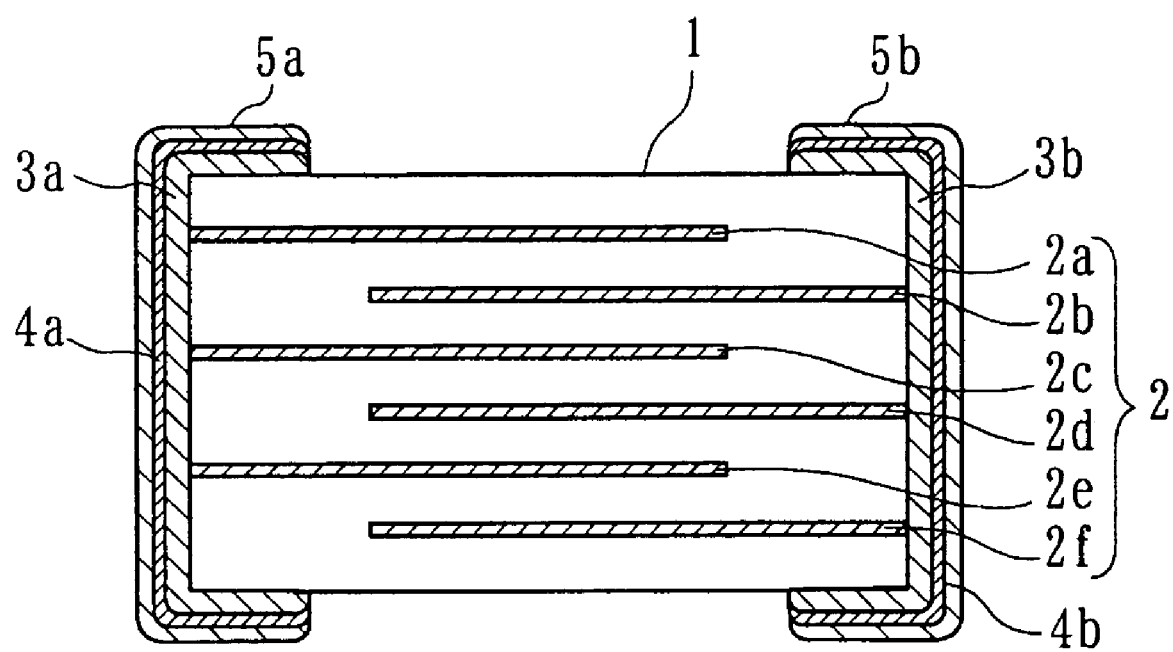
FIG. 1 is a sectional view schematically showing a monolithic ceramic capacitor that is an example of a ceramic electronic component according to the present invention.

Embodiments of the present invention will now be described in detail.

A conductive paste according to the present invention contains conductive powder, glass powder made of alkali borosilicate glass, and an organic vehicle.

The conductive powder may contain at least one selected from the group consisting of Ag, Pd, Ag—Pd alloy and Au.

The conductive powder contains spherical particles with an average particle size of about 0.5 to 1.0 μm and flat particles having an average particle size of about 1.5 to 5.0 μm and an aspect ratio of about 5:1 to 70:1, the aspect ratio being defined as the ratio of the maximum diameter to the average thickness. The ratio of the amount of the spherical particles to that of the flat particles is preferably about 1:4 to 4:1 on a weight basis.

When the spherical particles have an average particle size less than about 0.5 μm or the flat particles have an average particle size less than about 1.5 μm, a conductor made of the conductive powder suffers from cracking in some cases because the conductive powder is rapidly sintered, and this causes a deterioration in platability. Furthermore, a plating solution can penetrate the conductor because the denseness of the conductor is deteriorated due to cracks, and this causes an "explosion" in the conductor upon heating. In contrast, when the spherical particles have an average particle size more than about 1.0 μm or the flat particles have an average particle size more than about 5.0 μm, the denseness of the conductor is deteriorated in some cases because the conductive powder cannot be sufficiently sintered, and this also can cause an "explosion" in the conductor.

When the flat particles have an aspect ratio of less than about 5:1, the maximum diameter of the flat particles is excessively small. Therefore, the conductor suffers from cracking in some cases because the conductive powder is rapidly sintered, and this causes a deterioration in platability. Furthermore, the plating solution penetrates the conductor because the denseness of the conductor is deteriorated due to cracks, and this can cause an "explosion" in the conductor. In contrast, when the flat particles have an aspect ratio of more than about 70:1, the maximum diameter of the flat particles is excessively large. Therefore, the denseness of the conductor is deteriorated in some cases because the conductive powder cannot be sufficiently sintered, and this can cause an "explosion" in the conductor.

When the ratio of the amount of the spherical particles to that of the flat particles is less than about 1:4 on a weight basis, the content of the flat particles is excessively large. Therefore, the denseness of the conductor is deteriorated in some cases because the conductive powder cannot be sufficiently sintered, and this can cause an "explosion" in the conductor. In contrast, when the ratio of the amount of the spherical particles to that of the flat particles is more than about 4:1 on a weight basis, the conductor suffers from cracking in some cases because the conductive powder is rapidly sintered and this causes a deterioration in platability. Furthermore, the plating solution penetrates the conductor because the denseness of the conductor is deteriorated due to cracks, and this can cause an "explosion" in the conductor.

The glass powder contains alkali borosilicate glass containing about 10% to 31% of $B_2O_3$, about 65% to 86% of $SiO_2$, and more than about 0.5% to less than about 5% of $M_2O$ on a weight basis, wherein M represents an alkali metal element such as K, Li, or Na.

When the $B_2O_3$ content is less than about 10% by weight, an "explosion" occurs in the conductor in some cases because the adhesion of the conductor to a ceramic element, which may be referred to as a coated member, is low. In contrast, when the $B_2O_3$ content is more than about 31% by weight, the adhesion of the conductor to the ceramic element is low because the conductor has inferior platability, and this causes an "explosion" in the conductor in some cases.

When the $SiO_2$ content is less than about 65% by weight, the adhesion of the conductor to the ceramic element is low because the conductor has inferior platability, and this causes an "explosion" in the conductor in some cases. In contrast, when the $SiO_2$ content is more than about 86% by weight, the adhesion of the conductor to the ceramic element is low and this causes an "explosion" in the conductor in some cases.

When the $M_2O$ content is about 0.5% by weight or less, the adhesion of the conductor to the ceramic element is low and this causes an "explosion" in the conductor in some cases. In contrast, when the $M_2O$ content is about 5% by weight or more, the adhesion of the conductor to the ceramic element is low because the conductor has inferior platability, and this causes an "explosion" in the conductor in some cases.

The organic vehicle contains an organic binder and a solvent. Examples of the organic binder include ethyl cellulose, polyvinyl butyral, an acrylic resin and a methacrylic resin. Examples of the solvent include terpineol, butyl carbitol, butyl carbitol acetate and alcohols.

The conductive paste preferably contains about 66% to 78% of the conductive powder, about 2% to 8% of the glass powder, and about 18% to 30% of the organic vehicle on a weight basis.

When the conductive powder content is less than about 66% by weight, the conductive paste has excessively low viscosity and cannot therefore be readily handled in some cases. In contrast, when the conductive powder content is more than about 78% by weight, the conductive paste has excessively high viscosity and cannot therefore be readily handled in some cases.

When the glass powder content is less than about 2% by weight, the adhesion of the conductor to the ceramic element is low in some cases. In contrast, when the glass powder content is more than about 8% by weight, the conductor has inferior platability in some cases.

When the organic vehicle content is less than about 18% by weight, the conductive paste has excessively high viscosity and cannot therefore be readily handled in some cases. In contrast, when the organic vehicle content is more than about 30% by weight, the conductive paste has excessively low viscosity and cannot therefore be readily handled in some cases.

The conductive paste of the present invention is prepared by, for example, the procedure below. Starting materials of the glass powder are melted at a temperature of about 1,000° C. to 1,600° C. for a predetermined time and the molten mixture is poured into pure water, whereby the mixture is cooled. The resulting mixture is wet-ground with a ball mill or another mill and then dried, whereby the glass powder is prepared. The conductive powder, the glass powder, and the organic vehicle are mixed with a three-roll mill, whereby the conductive paste is prepared.

A ceramic electronic component according to the present invention will now be described using a monolithic ceramic capacitor as an example. FIG. 1 is a sectional view schematically showing a monolithic ceramic capacitor according to an embodiment of the present invention.

The monolithic ceramic capacitor includes a ceramic element 1, first internal conductors 2a, 2c and 2e placed in the ceramic element 1, second internal conductors 2b, 2d and 2f placed in the ceramic element 1, a first external conductor 3a placed on one end of the ceramic element 1, a second external conductor 3b placed on the other end thereof, a first lower metal coating 4a placed on the first external conductor 3a, a second lower metal coating 4b placed on the second external conductor 3b, a first upper metal coating 5a placed on the first lower metal coating 4a, and a second upper metal coating 5b placed on the first lower metal coating 4a.

The first internal conductors 2a, 2c and 2e are electrically connected to the first external conductor 3a and the second internal conductors 2b, 2d and 2f are electrically connected to the second external conductor 3b. The first internal conductors 2a, 2c and 2e and the second internal conductors 2b, 2d and 2f are alternately arranged in the ceramic element 1 and portions between the first internal conductors 2a, 2c and 2e and the second internal conductors 2b, 2d and 2f have capacitance.

The first internal conductors 2a, 2c and 2e and the second internal conductors 2b, 2d and 2f may contain at least one of Ni and Cu or at least one of Ag and Pd. Ag and Pd are preferable because they are hard to be oxidized. The first and second external conductors 3a and 3b contain at least one of Ag, Pd, Ag—Pd alloy and Au. The first and second lower metal coatings 4a and 4b may contain Ni or Cu. The first and second upper metal coatings 5a and 5b may contain solder or Sn.

The first and second external conductors 3a and 3b contain a glass component containing about 10% to 31% of $B_2O_3$, about 65% to 86% of $SiO_2$, and more than about 0.5% to less than about 5% of $M_2O$ on a weight basis, wherein M represents an alkali metal element. The first and second external conductors 3a and 3b can be prepared by firing, for example, the conductive paste of the present invention described above.

The monolithic ceramic capacitor can be manufactured by, for example, the procedure below.

Ceramic green sheets principally containing a dielectric compound such as barium titanate are prepared. An ordinary conductive paste, containing a noble metal element such as Ag or Pd, for forming an internal conductor is prepared and then applied onto some of the green sheets by a screen printing process, whereby predetermined electrode patterns are formed on the green sheets.

A plurality of the green sheets having the electrode patterns are stacked and then sandwiched between the green sheets having no electrode patterns. The resulting green sheets are pressed into a green ceramic compact, which is then cut into pieces, whereby green ceramic chips with a predetermined size are prepared.

Each green ceramic chip is heated to about 500° C., whereby the binder present is removed therefrom. The resulting chip is fired at a temperature of 1,000° C. to 1,500° C. for a predetermined time in the air, whereby the ceramic element 1 including the first internal conductors 2a, 2c and 2e and the second internal conductors 2b, 2d and 2f is obtained.

The conductive paste of the present invention is applied onto both ends of the ceramic element 1, which is dried and then fired at a temperature of about 800° C. to 900° C. for a predetermined time in the air, whereby the first and second external conductors 3a and 3b are each formed on the ends thereof.

The first and second lower metal coatings 4a and 4b are formed on the first and second external conductors 3a and 3b, respectively, by an electroplating process. The first and second upper metal coatings 5a and 5b are then formed on the first and second lower metal coatings 4a and 4b, respectively, whereby the monolithic ceramic capacitor is obtained.

Although, in the above embodiment, the monolithic ceramic capacitor is described as an example of the ceramic electronic component, the conductive paste of the present invention can be used to manufacture other types of ceramic electronic component such as a monolithic inductor.

Examples of the present invention will now be described in detail.

EXPERIMENT 1

In order to obtain a composition shown in Table 1, the following compounds for preparing glass were weighed: $B_2O_3$, $SiO_2$, and $M_2O$ ($K_2O$, $Li_2O$ or $Na_2O$). These compounds were fed in a platinum crucible and then heated at a temperature of 1,000° C. to 1,600° C. for 60 minutes, whereby the compounds were melted into a glass. The molten glass was poured into pure water from the crucible. The resulting glass was wet-ground with a ball mill and then dried, whereby glass powder with an average particle size of 0.5 to 2.0 μm was prepared. According to this procedure, several types of glass powder used in Examples 1 to 8 and Comparative Examples 1 to 4 were prepared.

These types of glass powder were measured for their softening point with a differential thermal analysis system. An X-ray diffraction analysis showed that these types of glass powder were amorphous.

Table 1 shows the composition and softening point of the types of glass powder used in the examples and the comparative examples.

TABLE 1

|  | Composition (percent by weight) | | | | | Softening Point |
| --- | --- | --- | --- | --- | --- | --- |
|  | $B_2O_3$ | $SiO_2$ | $K_2O$ | $Li_2O$ | $Na_2O$ | (° C.) |
| Example 1 | 31.0 | 65.0 | 4.0 | — | — | 710 |
| Example 2 | 27.0 | 70.0 | 3.0 | — | — | 740 |
| Example 3 | 18.0 | 80.0 | 2.0 | — | — | 780 |
| Example 4 | 10.0 | 86.0 | 4.0 | — | — | 818 |
| Example 5 | 29.4 | 70.0 | 0.6 | — | — | 743 |
| Example 6 | 26.7 | 68.5 | 4.8 | — | — | 735 |
| Example 7 | 27.0 | 70.0 | — | 3.0 | — | 756 |
| Example 8 | 27.0 | 70.0 | — | — | 3.0 | 748 |
| Comparative Example 1 | 9.0 | 88.0 | 3.0 | — | — | 865 |
| Comparative Example 2 | 32.0 | 64.0 | 4.0 | — | — | 645 |
| Comparative Example 3 | 20.0 | 75.0 | 5.0 | — | — | 666 |
| Comparative Example 4 | 17.5 | 82.0 | 0.5 | — | — | 875 |

A mixture containing the following components was prepared: 35.5% of spherical Ag powder with an average particle size of 0.7 μm, 35.5% of flat Ag powder having an average particle size of 3.5 μm and an aspect ratio of 30:1, 5.0% of one of the types of glass powder described above, and 24.0% of an organic vehicle on a weight basis. The mixture was kneaded with a three-roll mill, whereby a conductive paste for forming an external electrode was prepared. The organic vehicle contained ethyl cellulose and terpineol. The content of ethyl cellulose in the organic vehicle was 20% by weight.

Ceramic green sheets principally containing barium titanate were prepared. An ordinary conductive paste principally containing Ag was applied onto some of the green sheets by a screen printing process, whereby electrode patterns for forming internal electrodes were formed on the green sheets. A plurality of the green sheets having the electrode patterns were stacked and then sandwiched between the green sheets having no electrode patterns. The resulting green sheets were pressed into a green ceramic compact, which was then cut into pieces, whereby green ceramic chips were prepared. Each green ceramic chip was heated to about 500° C., whereby binder was removed therefrom. The resulting chip was fired at a temperature of 1,000° C. to 1,500° C. in the air, whereby a ceramic element was obtained.

The conductive paste prepared as described above was applied onto both ends of the ceramic element by a dipping process. The resulting ceramic element was dried and then fired at 850° C. for 20 minutes in the air, whereby external conductors were each formed on the ends thereof.

Ni coatings were each formed on the corresponding external conductors by an electroplating process and Sn coatings were each formed on the corresponding Ni coatings. According to this procedure, monolithic ceramic capacitors having a length of 1.0 mm, a width of 0.5 mm and a thickness of 0.5 mm were prepared. The monolithic ceramic capacitors were used as samples of Examples 1 to 7 and Comparative Examples of 1 to 4.

For the samples, the coating thickness and the adhesive strength of the external conductors were measured. Furthermore, the samples were inspected to determine whether solder had a splashed appearance, whereby the external conductors were evaluated whether an "explosion" occurred therein.

The coating thickness was determined as follows: five samples of each example or comparative example were measured for coating thickness with an X-ray thickness gauge and the obtained data were averaged.

The adhesive strength was determined as follows: for ten samples of each example or comparative example, leads were soldered to the external conductors, the resulting external conductors were measured for tensile strength, and the obtained data were averaged.

Whether solder was splashed was determined as follows: for 1,000 samples of each example or comparative example, a solder cream containing an eutectic Sn—Pb alloy was applied onto the external conductors, the resulting external conductors were passed through a reflow furnace twice, and the number of the samples having solder splashes was then counted.

For the samples of the examples and the comparative examples, Table 2 shows the coating thickness, the adhesive strength, and the number of the samples having solder splashes.

TABLE 2

| | Coating Thickness (μm) | | Adhesive strength | Number of Samples with |
| --- | --- | --- | --- | --- |
| | Ni Coating | Sn Coating | (N) | Solder Splashes |
| Example 1 | 2.05 | 3.82 | 13 | 0 |
| Example 2 | 2.11 | 3.89 | 14 | 0 |
| Example 3 | 2.24 | 3.77 | 14 | 0 |
| Example 4 | 2.08 | 3.91 | 10 | 0 |
| Example 5 | 2.16 | 3.88 | 13 | 0 |
| Example 6 | 2.26 | 3.79 | 12 | 0 |
| Example 7 | 2.19 | 3.96 | 13 | 0 |
| Example 8 | 2.07 | 3.97 | 12 | 0 |
| Comparative Example 1 | 2.07 | 3.77 | 2 | 150 |
| Comparative Example 2 | 0.84 | 1.22 | 3 | 135 |
| Comparative Example 3 | 0.95 | 1.35 | 2 | 153 |
| Comparative Example 4 | 2.18 | 3.87 | 2 | 168 |

As is clear from Table 2, the external conductors for the samples of Comparative Example 1 have an adhesive strength of 2 N and 150 of 1,000 samples have solder splashes, because the content of $B_2O_3$ in the glass powder is 9.0% by weight and the content of $SiO_2$ therein 88% by weight, that is, the $B_2O_3$ content is excessively low and the $SiO_2$ content is excessively high.

For the samples of Comparative Example 2, the Ni coatings have a thickness of 0.84 μm, the Sn coatings have a thickness of 1.22 μm, the external conductors have an adhesive strength of 3 N, and 135 of 1,000 samples have solder splashes. This is because the content of $B_2O_3$ in the glass powder is 32.0% by weight and the content of $SiO_2$ therein 64% by weight, that is, the $B_2O_3$ content is excessively high and the $SiO_2$ content is excessively low.

For the samples of Comparative Example 3, the Ni coatings have a thickness of 0.95 μm, the Sn coatings have a thickness of 1.35 μm, the external conductors have an adhesive strength of 2 N, and 153 of 1,000 samples have solder splashes. This is because the content of $K_2O$ in the glass powder is 5.0% by weight, that is, the $K_2O$ content is excessively high.

For the samples of Comparative Example 4, the external conductors have an adhesive strength of 2 N and 168 of 1,000 samples have solder splashes, because the content of $K_2O$ in the glass powder is 0.5% by weight, that is, the $K_2O$ content is excessively low.

In contrast, the Ni coatings for the samples of Examples 1 to 8 have a thickness of 2.07 to 2.26 μm, the Sn coatings have a thickness of 3.77 to 3.97 μm, and the external conductors have superior platability, high heat resistance, and superior solder wettability. Furthermore, the external conductors have an adhesive strength of 10 to 14 N, that is, the external conductors are superior in adhesive strength. The external conductors further have high denseness and no solder splashes, that is, an "explosion" had been prevented from occurring in the external conductors.

Experiment 2

Several types of Ag powder used as conductive powder were prepared so as to have an average particle size, an aspect ratio, and a mixing ratio shown in Table 3. The mixing ratio is defined as the ratio of the amount of spherical particles to that of flat particles on a weight basis and may be referred to as a spherical particle-to-flat particle ratio.

The following materials were mixed: 71% of each type of Ag powder, 5.0% of a type of glass powder, and 24.0% of an organic vehicle on a weight basis. The type of glass powder was the same as that used in Example 2 shown in Table 2, and the organic vehicle was the same as that used in Experiment 1. The mixture was kneaded with a three-roll mill, whereby a conductive paste for forming an external electrode was prepared.

Several conductive pastes were prepared by this procedure and monolithic ceramic capacitors were prepared by the same procedure as that described in Experiment 1 using the conductive pastes. The monolithic ceramic capacitors were used as samples of Examples 11 to 27.

The samples were evaluated for coating thickness and adhesive strength and the number of the samples having solder splashes was counted by the same procedures as those described in Experiment 1.

Evaluation results are shown in Table 3.

samples have solder splashes, because the spherical Ag particles have an average particle size of 1.1 μm, that is, the average particle size thereof is excessively large.

For the samples of Comparative Example 22, the Ni coatings have a thickness of 0.93 μm, the Sn coatings have a thickness of 1.33 μm, the external conductors have an adhesive strength of 5 N, and 35 of 1,000 samples have solder splashes, because the flat Ag particles have an average particle size of 1.3 μm, that is, the average particle size thereof is excessively small.

For the samples of Comparative Example 23, the external conductors have an adhesive strength of 8 N and 66 of 1,000 samples have solder splashes, because the flat Ag particles have an average particle size of 5.5 μm, that is, the average particle size thereof is excessively large.

For the samples of Comparative Example 24, the Ni coatings have a thickness of 0.88 μm, the Sn coatings have a thickness of 1.18 μm, the external conductors have an

TABLE 3

| | Average Particle Size of Spherical Ag Particles (μm) | Average Particle Size of Flat Ag Particles (μm) | Aspect Ratio of Flat Ag Particles | Ratio of Spherical Ag Particles to Flat Ag Particles | Coating Thickness (μm) | | Adhesive Strength (N) | Number of Samples Having Solder Splashes |
|---|---|---|---|---|---|---|---|---|
| | | | | | Ni Coating | Si Coating | | |
| Example 11 | 0.7 | 3.5 | 30:1 | 1:1 | 2.11 | 3.89 | 14 | 0 |
| Example 12 | 0.7 | 3.5 | 30:1 | 1:4 | 2.15 | 3.97 | 12 | 0 |
| Example 13 | 0.7 | 3.5 | 30:1 | 4:1 | 2.08 | 3.78 | 13 | 0 |
| Example 14 | 0.5 | 3.5 | 30:1 | 1:1 | 2.08 | 3.88 | 12 | 0 |
| Example 15 | 1.0 | 3.5 | 30:1 | 1:1 | 2.11 | 3.77 | 12 | 0 |
| Example 16 | 0.7 | 3.5 | 5:1 | 1:1 | 2.06 | 3.85 | 14 | 0 |
| Example 17 | 0.7 | 3.5 | 70:1 | 1:1 | 2.20 | 3.88 | 13 | 0 |
| Example 18 | 0.7 | 1.5 | 30:1 | 1:1 | 2.12 | 3.96 | 11 | 0 |
| Example 19 | 0.7 | 5.0 | 30:1 | 1:1 | 2.10 | 3.88 | 13 | 0 |
| Comparative Example 20 | 0.4 | 3.5 | 30:1 | 1:1 | 0.97 | 1.25 | 5 | 30 |
| Comparative Example 21 | 1.1 | 3.5 | 30:1 | 1:1 | 2.10 | 3.79 | 9 | 41 |
| Comparative Example 22 | 0.7 | 1.3 | 30:1 | 1:1 | 0.93 | 1.33 | 5 | 35 |
| Comparative Example 23 | 0.7 | 5.5 | 30:1 | 1:1 | 2.05 | 3.67 | 8 | 66 |
| Comparative Example 24 | 0.7 | 3.5 | 4:1 | 1:1 | 0.88 | 1.18 | 4 | 28 |
| Comparative Example 25 | 0.7 | 3.5 | 75:1 | 1:1 | 2.11 | 3.88 | 8 | 58 |
| Comparative Example 26 | 0.7 | 3.5 | 30:1 | 1:9 | 2.15 | 3.78 | 7 | 72 |
| Comparative Example 27 | 0.7 | 3.5 | 30:1 | 9:1 | 0.98 | 1.25 | 5 | 42 |

As is clear from Table 2 and Table 3, the samples of Examples 11 to 19 and Comparative Examples 20 to 27 have superior properties as compared to the samples of Comparative Examples 1 to 4. The samples of Examples 11 to 19 have particularly superior properties because they were prepared using the types of Ag powder prepared by mixing the spherical particles and flat particles having preferable properties at a preferable ratio.

For the samples of Comparative Example 20, the Ni coatings have a thickness of 0.97 μm, the Sn coatings have a thickness of 1.25 μm, the external conductors have an adhesive strength of 5 N, and 30 of 1,000 samples have solder splashes, because the spherical Ag particles have an average particle size of 0.4 μm, that is, the average particle size thereof is excessively small.

For the samples of Comparative Example 21, the external conductors have an adhesive strength of 9 N and 41 of 1,000 adhesive strength of 4 N, and 28 of 1,000 samples have solder splashes, because the flat Ag particles have an aspect ratio of 4:1, that is, the aspect ratio thereof is excessively small.

For the samples of Comparative Example 25, the external conductors have an adhesive strength of 8 N and 58 of 1,000 samples have solder splashes, because the flat Ag particles have an aspect ratio of 75:1, that is, the aspect ratio thereof is excessively large.

For the samples of Comparative Example 26, the external conductors have an adhesive strength of 7 N and low denseness and 72 of 1,000 samples have solder splashes, because the Ag powder has a spherical particle-to-flat particle ratio of 1:9 on a weight basis, that is, the mixing ratio thereof is excessively small.

For the samples of Comparative Example 27, the Ni coatings have a thickness of 0.98 μm, the Sn coatings have a thickness of 1.25 μm, the external conductors have an adhesive strength of 5 N and low denseness, and 42 of 1,000 samples have solder splashes, because the mixing ratio is 9:1, that is, the mixing ratio is excessively large.

In contrast, for the samples of Examples 11 to 19, the Ni coatings have a thickness of 2.06 to 2.20 μm, the Sn coatings have a thickness of 3.77 to 3.97 μm, and the external conductors have good platability, high heat resistance and superior solder wettability. This is because the external conductors were prepared using the above types of Ag powder in which the average particle size of the spherical particles, the average particle size and aspect ratio of the flat particles, and the mixing ratio are within the scope of the present invention.

Furthermore, the external conductors have an adhesive strength of 11 to 14 N, that is, the external conductors are superior in adhesive strength. The external conductors further have high mechanical strength, high denseness, and no solder splashes, that is, an "explosion" was prevented from occurring in the external conductors.

What is claimed is:

1. A conductive paste comprising:
   conductive powder;
   glass powder; and
   an organic vehicle,
   wherein the glass powder comprises about 10% to 31% of $B_2O_3$, about 65% to 86% of $SiO_2$, and more than about 0.5% to less than about 5% of $M_2O$ on a weight basis, where M represents an alkali metal element and
   wherein the conductive powder contains spherical particles with an average particle size of about 0.5 to 1.0 μm and flat particles having an average particle size of about 1.5 to 5.0 μm and an aspect ratio of about 5:1 to 70:1, the aspect ratio being the ratio of the maximum diameter to the average thickness, and wherein the ratio of the amount of the spherical particles to that of the flat particles ranges from about 1:4 to 4:1 on a weight basis.

2. The conductive paste according to claim 1, wherein conductive powder contains at least one member selected from the group consisting of Ag, Pd, Ag-Pd alloy and Au.

3. The conductive past of claim 2, wherein the amount of conductive powder is about 66% to 78%, the amount of glass powder is about 2% to 8%, and the amount of vehicles is about 18% to 30%.

4. The conductive paste of claim 1, wherein the amount of conductive powder is about 66% to 78%, the amount of glass powder is about 2% to 8%, and the amount of vehicles is about 18% to 30%.

5. A ceramic electronic component comprising:
   a ceramic element; and an external conductor on the component element, wherein the external conductor comprises a glass component comprising about 10% to 31% of $B_2O_3$, about 65% to 86% of $SiO_2$, and more than about 0.5% to less than about 5% of $M_2O$ on a weight basis, where M represents an alkali metal element and wherein the external conductor contains spherical particles with an average particle size of about 0.5 to 1.0 μm and flat particles having an average particle size of about 1.5 to 5.0 μm and an aspect ratio of about 5:1 to 70:1, the aspect ratio being the ratio of the maximum diameter to the average thickness, and wherein the ratio of the amount of the spherical particles to that of the flat particles ranges from about 1:4 to 4:1 on a weight basis.

6. The ceramic electronic component according to claim 5, wherein the external conductor contains at least one member selected from the group consisting of Ag, Pd, Ag-Pd alloy and Au.

7. The ceramic electronic component according to claim 6, further comprising an internal conductor in the ceramic element and electrically connected to the external conductor.

8. The ceramic electronic component according to claim 7, wherein the internal conductor comprises at least one of Ag and Pd.

9. The ceramic electronic component according to claim 8, further comprising a metal coating on the external conductor.

10. The ceramic electronic component according to claim 9, wherein the metal coating comprises Ni, Cu, Sn or solder.

11. The ceramic electronic component according to claim 10, wherein the metal coating comprises a Ni coating on the external conductor and a Sn coating on the Ni coating.

12. The ceramic electronic component according to claim 5, further comprising an internal conductor in the ceramic element and electrically connected to the external conductor.

13. The ceramic electronic component according to claim 12, wherein the internal conductor comprises at least one of Ag and Pd.

14. The ceramic electronic component according to claim 5, further comprising a metal coating on the external conductor.

15. The ceramic electronic component according to claim 14, wherein the metal coating comprises Ni, Cu, Sn or solder.

16. The ceramic electronic component according to claim 15, wherein the metal coating comprises a Ni coating on the external conductor and a Sn coating on the Ni coating.

* * * * *